(12) United States Patent
Michel et al.

(10) Patent No.: US 11,490,227 B2
(45) Date of Patent: Nov. 1, 2022

(54) METHOD FOR COMMUNICATION BETWEEN A VEHICLE CONTROL SYSTEM AND A SET OF MOBILE TELECOMMUNICATION DEVICES

(71) Applicant: PSA AUTOMOBILES SA, Poissy (FR)

(72) Inventors: Stephane Michel, Foussemagne (FR); Hugo Hanen, Burnhaupt le Bas (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 17/638,593

(22) PCT Filed: Aug. 25, 2020

(86) PCT No.: PCT/FR2020/051496
§ 371 (c)(1),
(2) Date: Feb. 25, 2022

(87) PCT Pub. No.: WO2021/048481
PCT Pub. Date: Mar. 18, 2021

(65) Prior Publication Data
US 2022/0272492 A1 Aug. 25, 2022

(30) Foreign Application Priority Data

Sep. 13, 2019 (FR) .................................. 1910124

(51) Int. Cl.
*H04W 24/00* (2009.01)
*H04W 4/029* (2018.01)
*H04W 4/40* (2018.01)

(52) U.S. Cl.
CPC ............. *H04W 4/029* (2018.02); *H04W 4/40* (2018.02)

(58) Field of Classification Search
CPC .............................. H04W 4/029; H04W 4/40
See application file for complete search history.

(56) References Cited

U.S. PATENT DOCUMENTS

2011/0136476 A1 6/2011 Beasley
2012/0161927 A1 6/2012 Pierfelice et al.
(Continued)

FOREIGN PATENT DOCUMENTS

EP 1336938 A2 8/2003

OTHER PUBLICATIONS

International Search Report for PCT/FR2020/051496 dated Nov. 25, 2020.
Written Opinion for PCT/FR2020/051496 dated Nov. 25, 2020.

*Primary Examiner* — Erika A Washington
(74) *Attorney, Agent, or Firm* — Sandberg Phoenix & von Gontard PC (57) ABSTRACT

The invention relates to a method for communication between a vehicle control system and a set of mobile telecommunication devices. The communication method makes it possible to communicate between a vehicle control system and a set of mobile telecommunication devices, the set of mobile telecommunication devices comprising a first mobile telecommunication device and at least a second mobile telecommunication device. The communication method comprises a step (E1) of transmitting a message by the control system. The message indicates that the control system is in a position-tracking state and that this position is that of the first mobile telecommunication device. The communication method comprises a step (E2) of receiving and processing the message by the second mobile telecommunication device from which it results that the second mobile telecommunication device restricts its capacity to (Continued)

connect to the control system or prohibits itself from connecting to the control system.

12 Claims, 3 Drawing Sheets

(56) References Cited

U.S. PATENT DOCUMENTS

| | | | |
|---|---|---|---|
| 2013/0099892 A1* | 4/2013 | Tucker | B60R 25/01 340/5.61 |
| 2016/0294707 A1 | 10/2016 | Chen | |
| 2018/0370488 A1* | 12/2018 | Schoula | G07C 9/00896 |
| 2020/0193748 A1* | 6/2020 | Konicek | F24F 11/30 |

* cited by examiner

METHOD FOR COMMUNICATION BETWEEN A VEHICLE CONTROL SYSTEM AND A SET OF MOBILE TELECOMMUNICATION DEVICES

CROSS-REFERENCE TO RELATED APPLICATIONS

This application is the US National Stage under 35 USC § 371 of International Application No. PCT/FR2020/051496, filed 25 Aug. 2020 which claims priority to French Application No. 1910124 filed 13 Sep. 2019, both of which are incorporated herein by reference.

BACKGROUND

The invention relates to a communication method between a vehicle control system and a set of mobile telecommunication devices.

PRIOR ART

It is known to connect mobile telecommunication devices to a control system of a motor vehicle in order to activate one or more functions of the motor vehicle. To enable activation of the desired function, an application may be installed on the mobile telecommunication devices, this application being developed to interface with the control system.

However, managing communications between the control system and the mobile telecommunication devices may be difficult because these mobile telecommunication devices may each comprise an operating system that manages the connections in its own way between the concerned mobile telecommunication device and the control system. For example, even if the application asks to be disconnected from the control system, the operating system may decide to maintain this connection for a predetermined time, for example, of more than 15 seconds. Maintaining this connection is truly problematic, as this may prevent the connection of another mobile telecommunication device whose connection was expected, for example at regular intervals whose time step is strictly less than the predetermined time. This situation may lead to the generation of a false alert message by the control system due to the non-connection of the mobile telecommunication device whose connection was expected even though this mobile telecommunication device was indeed available to connect.

European patent application EP1336938 describes a solution for identifying the last mobile device connected to the vehicle. However, this solution does not allow the vehicle to accept a connection that it expects if its capacity to accept connections is saturated, for example by a mobile device different from the one whose connection is expected, connected beforehand and which maintains its connection.

SUMMARY

The aim of the invention is to improve the communication between a vehicle control system and a set of mobile telecommunication devices, preferably with the aim of improving the availability of the control system to receive a priority connection.

To this end, a method for communication between a vehicle control system and a set of mobile telecommunication devices is disclosed, said set of mobile telecommunication devices comprising a first mobile telecommunication device and at least one second mobile telecommunication device, the communication method comprising a step of transmitting a message by the control system. The message that is transmitted indicates that the control system is in a position-tracking state and that the position being tracked is that of the first mobile telecommunication device. The communication method further comprises a step of receiving and processing the message by the second mobile telecommunication device, resulting in the second mobile telecommunication device restricting its capacity to connect to the control system or prohibiting itself from connecting to the control system.

Restricting the capacity of the second mobile telecommunication device to connect to the control system or prohibiting it from connecting to the control system allows improvement of the availability of the control system to receive a connection from the first mobile telecommunication device, which is considered to have priority.

The communication method may further comprise one or more of the following features:
- the processing of the message by the second mobile telecommunication device causes the second mobile telecommunication device to be placed in a state such that the second mobile telecommunication device is prohibited from connecting to the control system in order to communicate its position to the control system or solely to notify the control of its presence, and/or in that the second mobile telecommunication device having restricted its connection capacity is authorized to connect to the control system in order to send one or more user commands to the control system;
- the processing of the message by the second mobile telecommunication device causes the second mobile telecommunication device to be placed in a state in which it prohibits any connection to the control system;
- the first mobile telecommunication device connects to the control system several times, for example every 8 seconds, to allow the control system to track the position of the first mobile telecommunication device;
- for each connection of the first mobile telecommunication device to the control system in order to allow the control system to track the position of the first mobile telecommunication device, said first mobile telecommunication device transmits its position relative to the vehicle or notifies the control system of its presence;
- the message comprises data identifying the first mobile telecommunication device and data indicating that the control system is in the position-tracking state;
- the transmitted message is of the type to be received by all the mobile telecommunication devices of the set of mobile telecommunication devices without the need for connection to the control system.

A method of operating a vehicle comprising a control system capable of communicating with a set of mobile telecommunication devices is also disclosed, said set of mobile telecommunication devices comprising a first mobile telecommunication device and at least one second mobile telecommunication device, the operating method comprising a step of transmitting a message by the control system. In this operating method:
- the message indicates that the control system is in a position-tracking state and that the position being tracked is that of the first mobile telecommunication device,
- the operating method comprises a step of receiving and processing the message by the second mobile telecommunication device, resulting in the second mobile telecommunication device restricting its capacity to connect to the control system or prohibiting itself from connecting to the control system, prior to the step of transmitting the message, the operating method comprises a step of activating a function of the vehicle on request by the first mobile telecommunication device, the activation step causing the activation of the position-tracking state, then the implementation of the transmission step.

According to a particular embodiment, the operating method may be such that:

the activated function is a vehicle start function, the first mobile telecommunication device connects to the control system several times, for example every 8 seconds, to allow the control system to track the position of the first mobile telecommunication device, the control system detects a loss of the first mobile telecommunication device caused by a lack of connection of the first mobile telecommunication device expected by the control system to track the position of the first mobile telecommunication device, the operating method comprises a step of issuing a warning triggered by the detection of the loss of the first mobile telecommunication device.

Lastly, a vehicle, preferably an automobile, is disclosed comprising a control system configured to:

implement the communication method between the control system and a set of mobile telecommunication devices, or implement the operating method as described.

Other advantages and features will become clear from the detailed description that follows.

BRIEF DESCRIPTION OF THE DRAWINGS

The claimed invention will be better understood on reading the detailed description that follows, given solely by way of non-limiting example and done in reference to the accompanying drawings listed below.

In the figures, the same references are used to designate the same elements.

DETAILED DESCRIPTION

Figure 1:
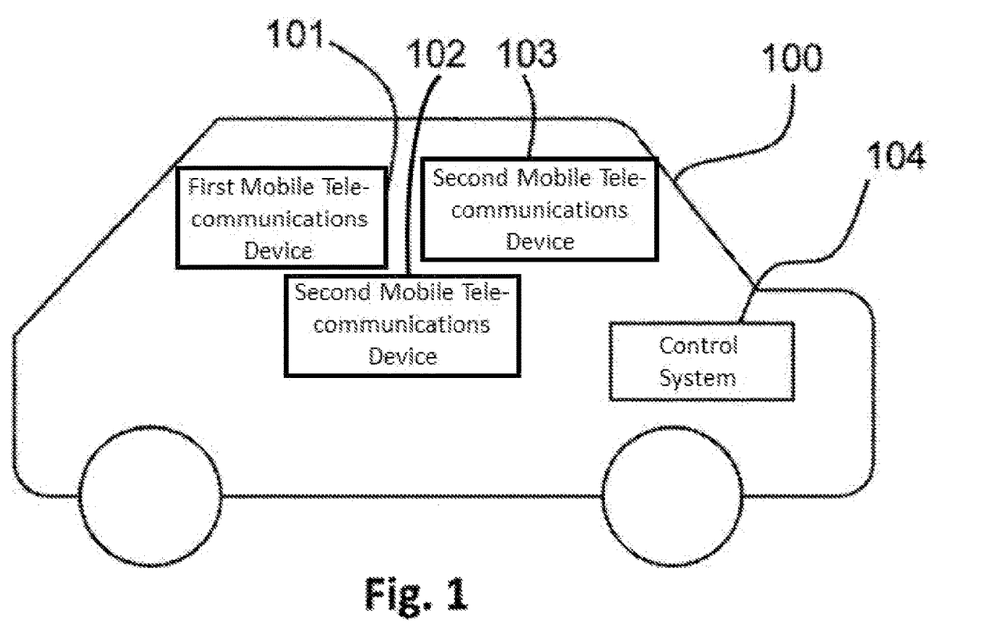
FIG. 1 schematically shows a vehicle and a set of mobile telecommunication devices placed in the passenger compartment of the vehicle.

The invention relates to a method for communication between a control system 104 of a vehicle 100 and a set of mobile telecommunication devices 101, 102, 103 as for example visible in FIG. 1.

Each mobile telecommunication device 101, 102, 103, also called a "smart device," within the meaning of the present description may be configured to control the activation of one or more functions of the vehicle 100 via the control system 104. For example, each mobile telecommunication device 101, 102, 103 may be chosen from: a telephone, such as a multifunctional cell phone, a touchpad, and a connected watch, also called a smartwatch. Each mobile telecommunication device 101, 102, 103 may comprise an operating system on which an application is installed that is configured to interact with the control system 104 in the manner described in the present description.

The control system 104 may comprise the necessary means to communicate with each of the mobile telecommunication devices 101, 102, 103 and to control the vehicle 100, for example by activating a function whose activation is controlled by one of the mobile telecommunication devices. For example, the control system 104 may comprise a processor or a computer participating in implementing the communication method described in the present description.

Communications between the control system 104 and the mobile telecommunication devices 101, 102, 103 are wireless.

Preferably, each connection or exchange of data between a mobile telecommunication device 101, 102, 103 and the control system 104 is done according to the Bluetooth protocol, preferably in its BLE (for "Bluetooth Low Energy") embodiment, for example in version 4.2 or 5.0 of this protocol.

The functions of the vehicle 100 may be chosen from: a vehicle 100 start function, a vehicle 100 locking function for example allowing the doors of the vehicle 100 to be closed, a vehicle 100 unlocking function for example allowing the vehicle 100 doors to be opened, and at least one or more user functions. The user functions may include the following: an activation of the horn of the vehicle 100, a sequential opening or closing of the windows of the vehicle 100, if necessary an opening or closing of the motorized trunk of the vehicle 100, if necessary an opening or a closing of the motorized sliding side doors of the vehicle 100, an activation of the turn signals of the vehicle 100, an activation of the headlights of the vehicle 100. Knowledge of the position of one of the mobile telecommunication devices 101, 102, 103 may be used to authorize starting of the vehicle 100, to display a locking request notification of the vehicle 100, or to display an unlocking request notification of the vehicle 100.

Subsequently, reference is made to a so-called problematic situation for which the vehicle 100 seeks, preferably via its control system 104, to track the position of a mobile telecommunication device in particular by using data associated with a connection of this mobile telecommunication device. However, it is possible for the connection attempt of this mobile telecommunication device to fail because of another mobile telecommunication device whose connection with the control system 104 is active, as a result of which the control system generates an erroneous warning that the mobile telecommunication device whose connection attempt failed, although still present, is "lost" because it did not connect.

For example, the position of the mobile telecommunication device that the control system 104 seeks to track may be determined by the concerned mobile telecommunication device, which then sends this position to the control system 104.

In speaking of a mobile telecommunication device, "lost" means that the mobile telecommunication device has not indicated its presence or its position as expected, for example every 8 seconds. It is then considered that the mobile telecommunication device is no longer present in the vehicle 100. When the lost mobile telecommunication device is a means of starting the vehicle 100, a user of the vehicle 100, for example the driver, is preferentially informed that the means of starting the vehicle 100 is no longer present in the vehicle 100: thus, the user is informed that if, for example, the internal combustion engine of the vehicle 100 stops, he will no longer be able to start the vehicle 100.

Figure 2:
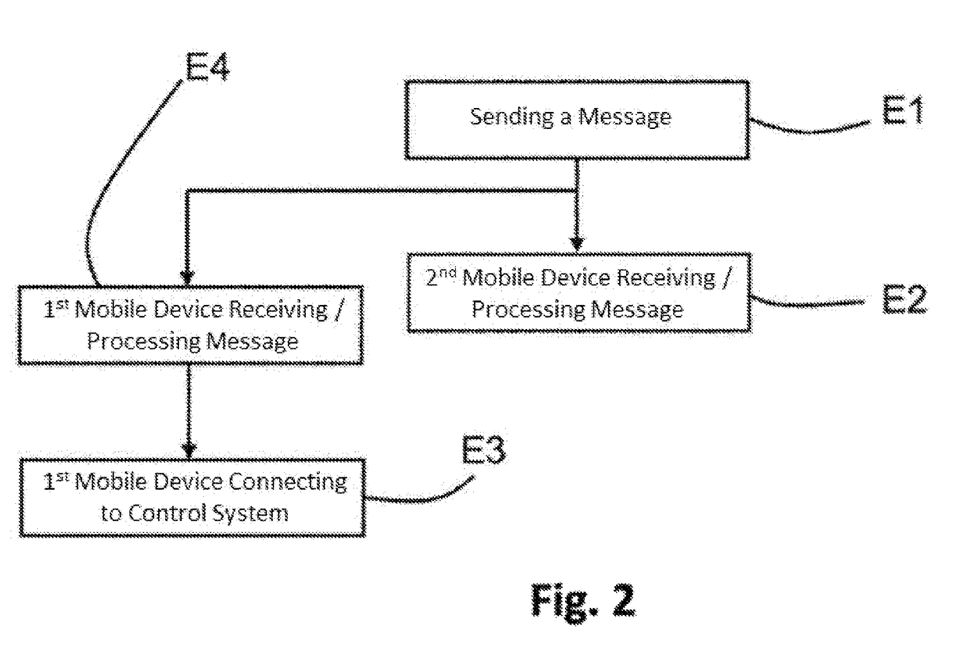
FIG. 2 schematically shows the steps of a method of communication between a vehicle control system and the mobile telecommunication devices.

It follows from what has been described previously that said set of mobile telecommunication devices 101, 102, 103 comprises a first mobile telecommunication device 101 and at least one second mobile telecommunication device 102. The communication method, a non-limiting example of which is illustrated in FIG. 2, comprises a step E1 of sending a message via the control system 104, the message indicating that the control system 104 is in a position-tracking state and that the position being tracked is that of the first mobile telecommunication device 101. Thus, the position-tracking state of the control system 104 allows tracking of the position of the first mobile telecommunication device 101. The position tracked by the first mobile telecommunication device 101 is preferably its position relative to the vehicle 100. The communication method also comprises a step E2 of receiving and processing the message by the second mobile telecommunication device 102, from which it results that the second mobile telecommunication device 102 restricts its capacity to connect to the control system 104 or prohibits itself from connecting to the control system 104. This makes it possible, within the framework of the communication method, to prioritize the connections of the first mobile telecommunication device 101 in order to limit incoming connections to the control system 104 so as to improve the availability of the control system 104 to receive an incoming connection initiated by the first mobile telecommunication device 101 with the aim of signaling itself so that position tracking may be carried out by the vehicle 100, and more particularly by the control system 104. In other words, the communication method allows the first mobile telecommunication device 101 to refresh its position by reducing the probability of the problematic situation occurring or without the problematic situation occurring.

The connection capacity restriction mentioned above has the advantage of limiting the occurrence of the problematic situation, while still allowing certain connections of one or more "non-tracked" mobile telecommunication devices, for example by authorizing them to send so-called "user" commands to activate user functions of the vehicle 100. The non-tracked mobile telecommunication device(s) each correspond to a second mobile telecommunication device 102, 103.

Prohibiting connection to the control system 104 makes it possible to ensure that only the first mobile telecommunication device 101 is able to connect to the control system 104: the problematic situation should therefore no longer occur.

In this sense, the restriction of connection capacity and the prohibition to connect to the control system 104 described above present a common inventive concept allowing limitation or avoidance of connection failures of the first communication device 101 to the control system 104 according to the problematic situation.

For example, the processing of the message, during step E2, by the second mobile telecommunication device 102 causes the second mobile telecommunication device 102 to be placed in a state such that it is prohibited from connecting to the control system 104 in order to communicate its position to the latter or solely to notify it of its presence. Indeed, such connections are generally numerous and increase the risk of the problematic situation occurring. Thus, in this example the communication method proposes to limit position tracking to only the first mobile telecommunication device 101 whose communications, that is to say, connections to the control system 104, have priority in the context of position tracking.

Even if the connection capacity of the second mobile telecommunication device 102 has been restricted, there may be a need to satisfy one or more user commands, for example generated by a user of the vehicle 100 by using the second mobile communication device 102 to implement one or more user functions as described above. To satisfy this need, the second mobile telecommunication device 102 having restricted its connection capacity is authorized to connect to the control system 104 in order to send to the control system 104 one or more user commands. Each user command may allow the activation of a user function of the vehicle 100 as described above.

According to one embodiment, the processing of the message by the second mobile telecommunication device 102 causes the second mobile telecommunication device 102 to be placed in a state in which the second mobile telecommunication device 102 prohibits any connection to the control system 104. This makes it possible to ensure that the second mobile telecommunication device 102 will not prevent the connection of the first mobile telecommunication device 101.

Of course, the set of mobile telecommunication devices 101, 102, 103 may comprise a plurality of second mobile telecommunication devices 102, 103 (for example, two in FIG. 1). In this case, everything that applies in the present description to the second mobile telecommunication device 102, 103 may apply to each of the second mobile telecommunication devices 102, 103. For example, step E2 of receiving and processing the message is then implemented for each of the second mobile telecommunication devices 102, 103.

In order to track the position of the first mobile telecommunication device 101, the first mobile telecommunication device 101 may connect (step E3 in FIG. 2) to the control system 104 several times, preferably at regular intervals, for example every 8 seconds, to allow the vehicle 100, preferably the control system 104, to track the position of the first mobile telecommunication device 101. Thus, when the control system 104 is in the position-tracking state, the communication method implements a tracking step in which the control system 104 is waiting for connections from the first mobile telecommunication device 101.

In particular, the communication method may comprise a step E4 of receiving and processing the message (that transmitted during step E1) by the first mobile telecommunication device 101 such that the processing of the message by the first mobile telecommunication device 101 causes the connection of the first mobile telecommunication device 101 to be implemented several times (step E3) in order to allow the control system 104 to track the position of the first mobile telecommunication device 101.

These connections occurring several times effectively allow the first mobile telecommunication device 101 either to send its position to the control system 104 or simply to indicate its presence to the control system 104, which will then, as part of its position tracking, interpret each of these connections signifying the presence as an adequate positioning of the first mobile telecommunication device 101 with respect to the vehicle 100. In other words, for each connection of the first mobile telecommunication device 101 to the control system 104 in order to allow the control system 104 to track the position of the first mobile telecommunication device 101, said first mobile telecommunication device 101 may transmit its position relative to the vehicle 100 or may notify the control system 104 of its presence.

In order to effectively inform the second mobile telecommunication device 102, 103 and, if applicable, the first mobile telecommunication device 101 that position tracking is in progress, the message may comprise identification data of the first mobile telecommunication device 101 and data indicating that the control system 104 is in the position-tracking state. Therefore, upon receipt of the message, the second mobile telecommunication device 102, 103 may process this message (step E2) by decoding it to know the state of the control system 104 and may deduce therefrom, from the identification data contained in the message, that it is not the mobile telecommunication device whose position is to be tracked or is being tracked and that it must therefore adapt its operation in the manner described above by restricting its connection capacity, or by prohibiting itself from connecting to the control system 104. Furthermore, upon receipt of the message, the first mobile telecommunication device 101 may process this message (step E4) by decoding it to know the state of the control system 104 and may deduce therefrom, via its identifier corresponding to the identification data, that it must connect to the control system 104 in a suitable manner for the tracking of it position to be implemented. The control system 104 may, for example, manage up to four mobile telecommunication device sessions simultaneously, that is to say, four mobile telecommunication devices may be authenticated with their own rights with the control system 104. An authenticated mobile telecommunication device is said to be "paired" to the control system 104. Thus, the identification data of the first mobile telecommunication device 101 may correspond to data identifying one of the mobile telecommunication devices authenticated by the control system 104.

Preferably, the message transmitted by the transmission step E1 is of the type to be received by all the mobile telecommunication devices of the set of mobile telecommunication devices (of course within communication range of the control system 104) without the need for connection to the control system 104. This has the advantage of informing the mobile telecommunication devices, and in particular each second mobile telecommunication device 102, 103, without requiring a point-to-point connection between each of these telecommunication devices and the control system 104. To this end, the message may be a so-called "advertising" frame that may be consumed by all the mobile devices 101, 102, 103 of the set of surrounding mobile devices without the need for a connection to interpret the state of the control system 104. Here, "consumed" means that the frame may be received and processed. As part of the advertising frame, the latter may be an advertising frame of the Bluetooth communication protocol, in particular BLE, and may be formatted, preferably by the control system 104, to contain the identification data of the first mobile telecommunication device 101 and the datum indicating that the control system 104 is in the position-tracking state. This advertising frame may be encrypted in such a way that only the mobile telecommunication devices 101, 102, 103 paired with the vehicle 100, that is to say, preferably authenticated with the control system 104, are able to decrypt the content of this advertising frame.

It was previously mentioned that the first mobile telecommunication device 101 could transmit its position to the control system 104. For example, before transmitting its position to the control system 104, the first mobile telecommunication device 101 determines its position from an RSSI (abbreviation for "Received Signal Strength Indication") level measurement of a signal, preferably Bluetooth, transmitted by the control system 104. This measurement may vary from approximately −95 dBm to −30 dBm and makes it possible to know the proximity of the first mobile telecommunication device 101 for example with respect to a starting zone of the vehicle 100, in particular located just above the control system 104, or of the computer of the control system 104, having emitted the signal whose RSSI level is measured. For example, if the RSSI level of the signal considered is strictly lower than a threshold, for example −45 dBm (this threshold may be adapted according to the characteristics of the vehicle 100 and of the first mobile telecommunication device 101), it is deduced that the first mobile telecommunication device 101 is still positioned in the start-up zone and therefore that the first mobile telecommunication device 101 is not "lost"; on the contrary, if the RSSI level of the considered signal is above or equal to this threshold, it must notify the user of the vehicle 100 to prevent him from finding himself in a situation where he can no longer start the vehicle 100.

Preferably, among the various mobile telecommunication devices that have received the message, only the one whose position is being tracked may connect, for example at regular intervals, to indicate to the control system 104 that it is present in the vehicle 100 by communicating its position, and other mobile telecommunication devices will not, or will no longer, communicate their position. As a result, the described communication method has the advantage of limiting the number of connections to the control system 104 by mobile telecommunication devices when the position of one of them is being tracked.

It follows from what has been described above that the communication method may advantageously be implemented within an operating method of the vehicle 100 in which one wishes to know when a mobile telecommunication device whose position is being tracked is "lost," for example in order to activate a particular function, for example security, indicating the loss of the tracked mobile telecommunication device in order to inform a user of the vehicle 100, such as the driver of the vehicle 100.

In particular, everything that has been described in relation to the communication method may be part of the operating method of the vehicle 100.

Figure 3:
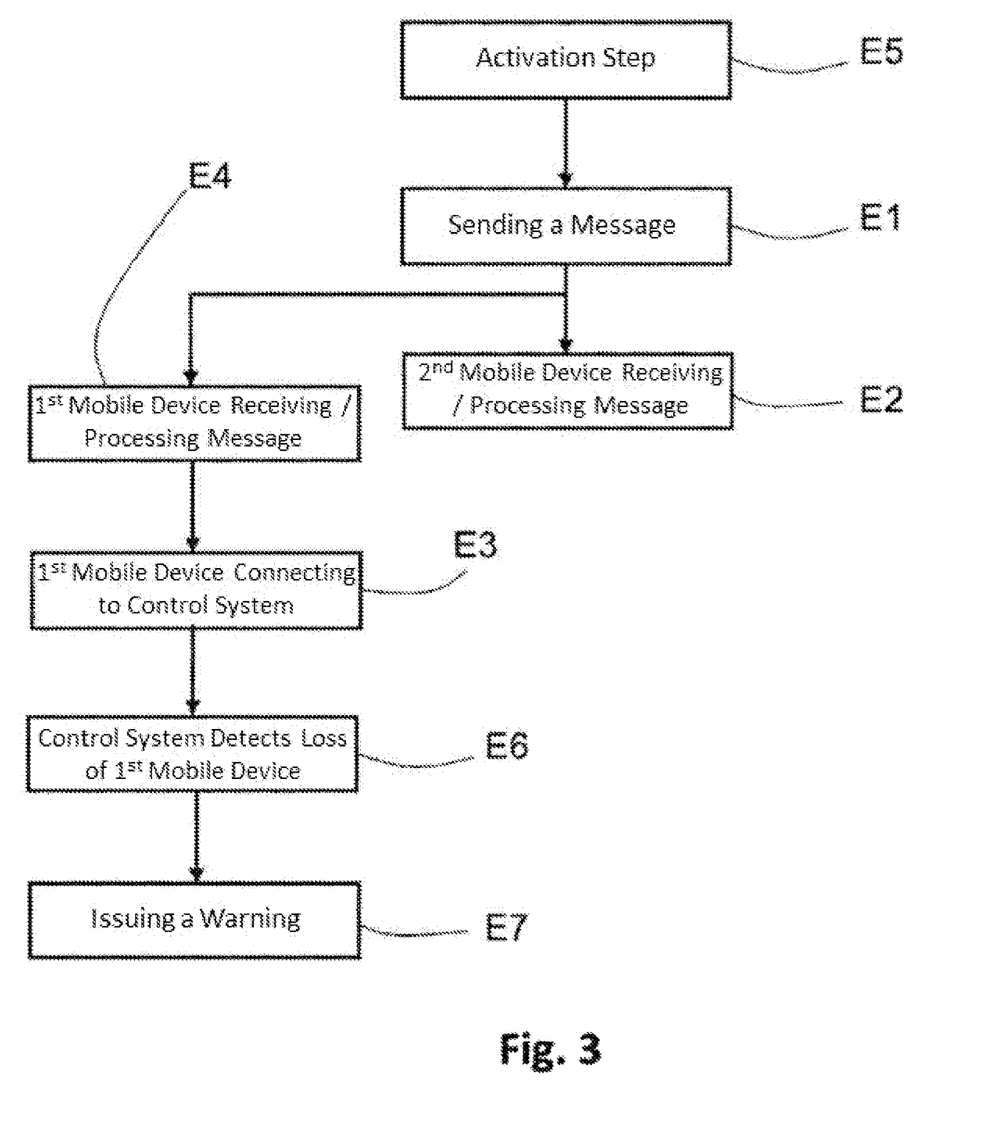
FIG. 3 schematically shows the steps of a vehicle operation method.

In this sense, the invention also relates to the operating method of the vehicle 100 whose control system 104 is able to communicate with the set of mobile telecommunication devices. A non-limiting example of such an operating method is illustrated in FIG. 3. The operating method comprises step E1 of transmitting and step E2 of receiving and processing the message by the second mobile telecommunication device 102. Prior to step E1 of sending the message, the operating method comprises a step E5 of activating a function of the vehicle 100 on request/command by the first mobile telecommunication device 101, the activation step E5 causing the activation of the position-tracking state, then the implementation of the transmission step E1. The activation step E5 allows a determination of which of the mobile telecommunication devices is the first mobile telecommunication device 101. Such an operating method allows the described communication method to be implemented and allows the position tracking of the first mobile communication device 101 to be exploited by the control system 104, for example with a view to ensuring a function of the vehicle 100, such as a warning function, in the event the first mobile telecommunication device 101 is lost.

According to a particular embodiment, there is an application for which tracking the position of the first mobile telecommunication device 101 is particularly suitable. In this application, the first mobile telecommunication device 101 was used to start the vehicle 100 and it is important to notify the user of the vehicle 100, such as the driver, when a disappearance of the first mobile device 101 is detected. This allows the user to be informed of the loss of the vehicle 100 starting means corresponding to the first mobile telecommunication device 101 in order to prevent him from noticing this loss only after having driven a long distance, for example of 300 km. In this case, the first mobile device 101 is also called vehicle 100 identifier. According to this particular embodiment, the activated function is a vehicle 100 start function. The first mobile telecommunication device 101 connects (step E3), preferably after having received and processed (step E4) the message transmitted by the transmission step E1, to the control system 104 several times, for example every 8 seconds, to allow the control system 104 to track the position of the first mobile telecommunication device 101. The control system 104 detects (step E6 in FIG. 3) a loss of the first mobile telecommunication device 101 caused by a lack of connection of the first mobile telecommunication device 101 expected by the control system 104 to track the position of the first mobile telecommunication device 101. The operating method comprises a step E7 of issuing (FIG. 3) a warning triggered by the detection of the loss of the first mobile telecommunication device 101, preferably while the engine of the vehicle 100 is running. The warning may be broadcast audibly or on a handset, also called dashboard, of the vehicle 100, preferably by request of the control system 104, to be perceived by the user of the vehicle 100 and therefore to indicate to the user that the first mobile telecommunication device 101 is no longer present in the vehicle 100, thus risking making it impossible to start the vehicle 100 in the future.

A particular example of the operating method is now described. According to this example, the mobile telecommunication devices 101, 102, 103 are preferably configured to activate one or more functions of the vehicle 100. The rights of each mobile telecommunication device 101, 102, 103 may be different so as to restrict the functions of the vehicle 100 that may be activated for each of the mobile telecommunication devices. According to this particular example, the vehicle 100 is started by placing one of the mobile telecommunication devices in a restricted zone in the vehicle 100 (corresponding for example to the starting zone mentioned above), from which it follows that this mobile telecommunication device becomes the first mobile telecommunication device 101. When the vehicle 100 is started, it is necessary to know whether or not the first mobile telecommunication device 101 used for starting is present so as to warn the user of the vehicle 100 if a disappearance is detected. To do this, the presence of the first mobile telecommunication device 101 is broadcast, in an advertising frame sent by the control system 104, followed by the session number of this first mobile telecommunication device 101 corresponding for example to the identification data described above of the first mobile telecommunication device 101 authenticated with the control system 104. Thus, the first mobile telecommunication device 101 receiving this frame will connect every 8 seconds to indicate to the control system 104 that it is present in the vehicle 100, and the other mobile telecommunication devices (the second mobile telecommunication devices 102, 103) receiving this frame will not communicate their position to the control system 104. With the engine running, if the vehicle 100 no longer receives information from the first mobile telecommunication device 101 that enabled it to start, then a warning signal, indicating the loss of the first mobile telecommunication device 101, will be sent via the handset to the user. In other words, if a disappearance is detected, the user will be notified, via a message broadcast to the handset of his vehicle, that his starting means is no longer present in the vehicle 100.

In this sense, the invention also relates to a vehicle 100, preferably a motor vehicle 100, comprising the control system 104 configured to implement the communication method between the control system 104 and the set of mobile devices, or configured to implement the operating method.

The communication method and the vehicle operating method each have an industrial application in the field of vehicles, preferably automobiles, and allow new functionalities to be introduced into the vehicle 100, such as starting the vehicle 100 with a mobile telecommunication device 101.

The invention claimed is:

1. A method of communication between a system for controlling a vehicle and a set of mobile telecommunication devices, said set of mobile telecommunication devices comprising a first mobile telecommunication device and at least one second mobile telecommunication device, the communication method comprising a step (E1) of transmitting a message by the control system, wherein the message indicates that the control system is in a position-tracking state and that the position being tracked is that of the first mobile telecommunication device, and in that the communication method comprises a step (E2) of receiving and processing the message by the second mobile telecommunication device, resulting in the second mobile telecommunication device restricting its capacity to connect to the control system or prohibiting itself from connecting to the control system.

2. The communication method according to claim 1, wherein the processing of the message by the second mobile telecommunication device causes the second mobile telecommunication device to be placed in a state such that it is prohibited from connecting to the control system in order to communicate its position to the control system or solely to notify the control system of its presence, and/or in that the second mobile telecommunication device having restricted its connection capacity is authorized to connect to the control system in order to send one or more user commands to the control system.

3. The communication method according to claim 1, wherein the processing of the message by the second mobile telecommunication device causes the second mobile telecommunication device to be placed in a state in which it prohibits any connection to the control system.

4. The communication method according to claim 1, wherein the first mobile telecommunication device connects to the control system several times to allow the control system to track the position of the first mobile telecommunication device.

5. The communication method according to claim 4, wherein, for each connection of the first mobile telecommunication device to the control system in order to allow the control system to track the position of the first mobile telecommunication device, said first mobile telecommunication device transmits its position relative to the vehicle or notifies the control system of its presence.

6. The communication method according to claim 1, wherein the message comprises data identifying the first mobile telecommunication device and data indicating that the control system is in the position-tracking state.

7. The communication method according to claim 1, wherein the transmitted message is of the type to be received by all the mobile telecommunication devices of the set of mobile telecommunication devices without the need for connection to the control system.

8. A method of operating a vehicle comprising a control system capable of communicating with a set of mobile telecommunication devices, said set of mobile telecommunication devices comprising a first mobile telecommunication device and at least one second mobile telecommunication device, the operating method comprising a step (E1) of transmitting a message by the control system, wherein:
- the message indicates that the control system is in a position-tracking state and that the position being tracked is that of the first mobile telecommunication device,
- the operating method comprises a step (E2) of receiving and processing the message by the second mobile telecommunication device, from which it results that the second mobile telecommunication device restricts its capacity to connect to the control system or prohibits itself from connecting to the control system,
- prior to the step (E1) of transmitting the message, the operating method comprises a step (E5) of activating a function of the vehicle on request by the first mobile telecommunication device, the activation step (E5) causing the activation of the position-tracking state, then the implementation of the transmission step (E1).

9. The operating method according to claim 8, wherein:
the activated function is a vehicle start function,
the first mobile telecommunication device connects to the control system several times, to allow the control system to track the position of the first mobile telecommunication device,
the control system detects (E6) a loss of the first mobile telecommunication device caused by a lack of connection of the first mobile telecommunication device expected by the control system to track the position of the first mobile telecommunication device,
the operating method comprises a step (E7) of issuing a warning triggered by the detection of the loss of the first mobile telecommunication device.

10. A vehicle, preferably an automobile, wherein, the vehicle comprises a control system configured to:
implement the communication method between the control system and a set of mobile telecommunication devices according to claim 1.

11. A vehicle, preferably an automobile, wherein the vehicle comprises a control system configured to:
implement the operating method according to claim 8.

12. The operating method according to claim 9, wherein the first mobile telecommunication device connects to the control system once every eight seconds.

* * * * *